United States Patent
Jaekel et al.

(10) Patent No.: US 8,757,889 B2
(45) Date of Patent: Jun. 24, 2014

(54) ROLLING ELEMENT BEARING COMPRISING A MULTI-PART CAGE

(75) Inventors: Jesko Jaekel, Kalchreuth (DE); Tobias Mederer, Schwanstetten (DE); Matthias Pitz, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/822,915

(22) PCT Filed: Jul. 7, 2011

(86) PCT No.: PCT/EP2011/061526
§ 371 (c)(1),
(2), (4) Date: Mar. 13, 2013

(87) PCT Pub. No.: WO2012/041548
PCT Pub. Date: Apr. 5, 2012

(65) Prior Publication Data
US 2013/0177271 A1 Jul. 11, 2013

(30) Foreign Application Priority Data
Sep. 30, 2010 (DE) .......................... 10 2010 047 142

(51) Int. Cl.
*F16C 33/46* (2006.01)
(52) U.S. Cl.
USPC .......................................... 384/577; 384/579
(58) Field of Classification Search
USPC .................. 384/548, 560, 573–574, 577–580
See application file for complete search history.

(56) References Cited

U.S. PATENT DOCUMENTS

| 1,358,848 | A | * | 11/1920 | Hindle et al. ................ 384/578 |
| 1,894,595 | A | | 1/1933 | Mitchel |
| 4,865,473 | A | | 9/1989 | De Vito |
| 4,874,260 | A | * | 10/1989 | Podhajecki ................... 384/470 |
| 2008/0092691 | A1 | | 4/2008 | Wittek et al. |
| 2011/0038578 | A1 | | 2/2011 | Brommer et al. |

FOREIGN PATENT DOCUMENTS

| DE | 202005005999 U1 | 8/2006 |
| JP | H053645 U | 1/1993 |
| JP | 2007332997 A | 12/2007 |
| KR | 655244 B1 * | 12/2006 |
| WO | WO 2009127191 A1 | 10/2009 |

* cited by examiner

*Primary Examiner* — Phillip A Johnson
(74) *Attorney, Agent, or Firm* — Davidson, Davidson & Kappel, LLC

(57) ABSTRACT

A rolling element bearing, in particular a roller/needle bearing, having a cage including at least one inner cage and at least one outer supporting cage, said cages having windows (3) which are adapted to the rolling elements (8) and have lateral end rims (4) connecting a plurality of windows (3) and crossbars and in which the rolling elements (8) are guided and secured from falling out. Either the inner cage and the supporting cage are configured as a split inner cage ring and/or a split supporting cage ring and the rings can be attached to each other at the ends or the inner cage and the supporting cage are configured as inner cage shells and/or supporting cage shells and the shells can be attached to each other at the ends.

18 Claims, 4 Drawing Sheets

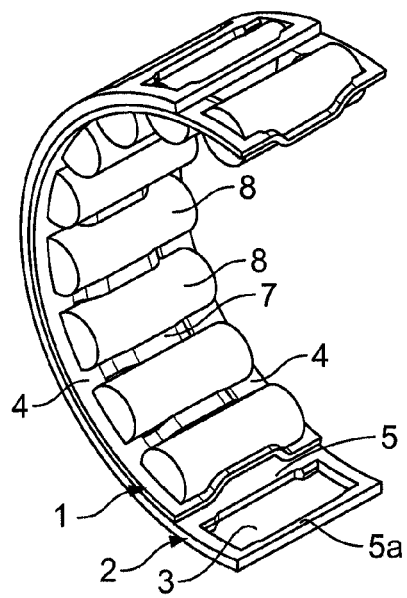
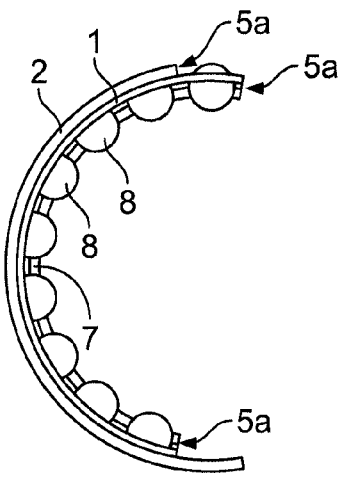
FIG. 3
FIG. 3A
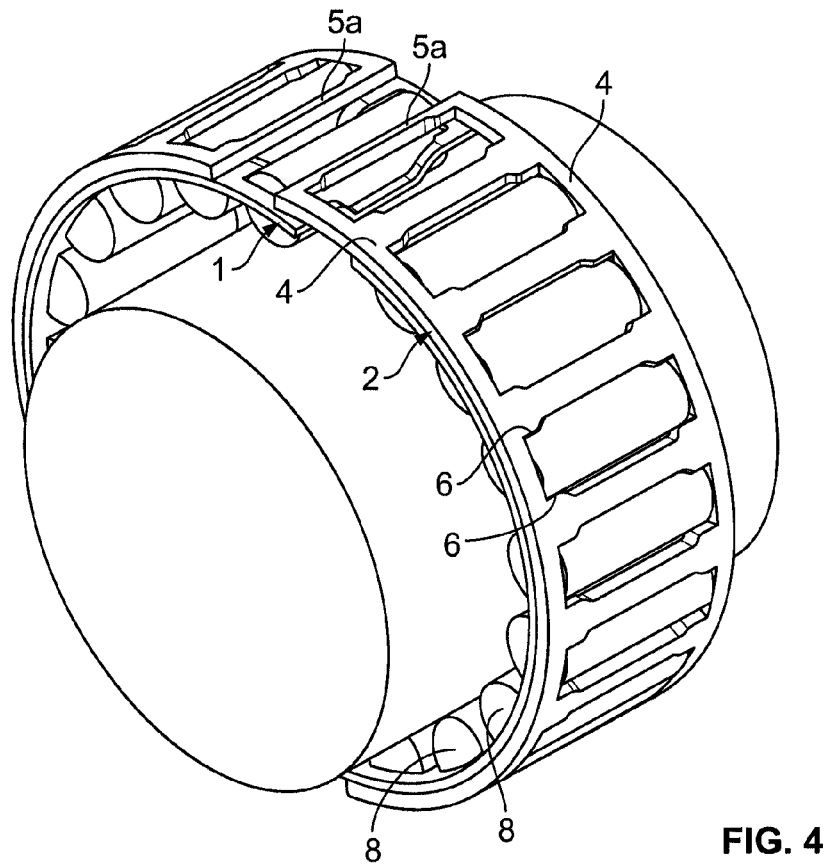
FIG. 4

ROLLING ELEMENT BEARING COMPRISING A MULTI-PART CAGE

The present invention relates to a rolling element bearing, in particular a roller/needle bearing, having a cage including at least one inner cage and at least one outer supporting cage, said cages having windows which are adapted to the rolling elements and have lateral end rims connecting a plurality of windows and crossbars and in which the rolling elements are guided and secured from falling out.

BACKGROUND

It is known from International Patent Application WO 2009/127 191 A1 that the cage can have associated therewith an inner cage in the form of a full ring and an outer supporting cage in the form of a full ring, which together are configured and adapted to guide and support the rolling elements. These ring-shaped cages are secured to each other.

SUMMARY OF THE INVENTION

It is a disadvantage that the cage assembled from a ring-shaped inner cage and a ring-shaped outer supporting cage must be handled like a solid cage and, for example, cannot be mounted on a bearing journal in an arbitrary way. Because both the inner cage and the supporting cage must be full rings, they are relatively complex to manufacture.

It is an object of the present invention to further improve a cage for a rolling element bearing, save weight, simplify manufacture, and also to facilitate installation in difficult conditions.

The present invention provides a rolling element bearing, in particular a roller/needle bearing, having a cage including at least one inner cage and at least one outer supporting cage, said cages having windows which are adapted to the rolling elements and have lateral end rims connecting a plurality of windows and crossbars and in which the rolling elements are guided and secured from falling out, wherein the inner cage and the supporting cage are configured as a split inner cage ring and/or a split supporting cage ring, and that the rings can be attached to each other at the ends. Alternatively, the object of the invention is also achieved in that the inner cage and the supporting cage are configured as inner cage shells and/or supporting cage shells, and that the shells are attached to each other at the ends.

If the inner cage and the supporting cage are configured as split rings, they are simpler to manufacture and easier to handle than full rings. If, in an advantageous embodiment, the shells are configured as half-shells, then four half-shells form the complete cage. However, it is also possible to provide smaller units, such as, for example, quarter-shells which are attached to each other at the ends, so that, for example, eight quarter-shells form a complete cage, because quarter-shells are even simpler to manufacture than half-shells. The described configuration of the inner cage and supporting cage rings and shells provides very high flexibility, so that the cages can be easily adapted to a wide variety of conditions of use.

In a particular attachment design, a clipped connection is proposed in which the split inner ring or the inner cage shells, in particular inner cage half-shells, are angularly offset from the split supporting cage ring or the supporting cage shells/half-shells by one window in the circumferential direction. The rings or shells/half-shells then have end crossbars which are narrower by half the extent of the other crossbars in the circumferential direction. This allows the rolling elements mounted in the end windows to ensure the connection of the half-shells to one another and to act as clipping elements. Since the crossbars and the ends are half the width of the others, one crossbar of reduced width on one ring end or on one shell/half-shell and one crossbar of reduced width on the other ring end or on the other shell/half-shell together form a crossbar which has the normal crossbar width. The rolling elements then lock the rings or shells/half-shells to each other via the windows and crossbars once the rings or shells/half-shells are clipped together. The width of the end crossbars of the rings or shells/half-shells may also be greater than that of a normal crossbar. As a result, the last crossbars must have a width equal to the sum of the widths of the end crossbars. This must be implemented in both the inner cage and the supporting cage.

A further aspect of the present invention provides that the inner cage ring and the supporting cage ring, or the inner cage shells/half-shells and the supporting cage shells/half-shells, be secured to each other, for example, by welding, brazing, crimping, and/or the like. However, they may also be only loosely push-fitted without direct attachment to one another. Advantageously, the rings or shells are inexpensively manufactured from sheet steel strip stock by profiling, stamping, bending round or rolling round.

The material used for the supporting cage ring and the supporting cage shells is thicker than that used for the inner cage shells to allow better support in the case of an externally guided cage and to accommodate larger forces in the case of a small inner cage ring or small inner cage shells. The inner cage ring or the inner cage shells are selected to have a greater material thickness if, in the case of larger cages, there is a risk of the inner ring being deformed by the weight of the bearing rollers. The rings and shells may also be manufactured from tubular sections by widening with an expandable plastic core, followed by stamping out of the windows. Finally, the rings and shells may also be manufactured by chip-removing machining. Furthermore, the rings or shells may also be made from plastic or aluminum, thus reducing the centrifugal force and weight. In order to reduce friction and increase the resistance to wear, the inner cage or the supporting cage may also be provided with a coating.

For improved guidance of the rolling elements, the crossbars of the rings or shells are formed with projections at their ends adjacent the end rims, said projections facing each other and allowing the rolling elements to be reliably guided therein. The crossbars of the inner cage shells are provided with preferably centrally located, approximately U-shaped or M-shaped deformations which are directed inwardly, creating a space from the supporting cage, in which space the rolling elements can be better retained. Advantageously, the crossbars are narrower between the projections than where they carry the projections, so that the rolling elements, in particular the rollers or needles, are guided in a well-centered manner. For improved guidance of the inner cage ring or inner cage shells, the supporting cage ring or supporting cage shells may have inwardly curved end rims, so that an inwardly curved U-shape is created. It should be noted here that the contact surface of the supporting cage may be larger than the contact surface of the inner ring.

BRIEF DESCRIPTION OF THE DRAWINGS

A preferred embodiment of the rolling element bearing designed in accordance with the present invention will be described in more detail below with reference to the accompanying drawings, in which:

FIG. 3 is a perspective view showing an inner cage half-shell and a supporting cage half-shell fitted within one another and having rolling elements inserted therein;

FIG. 3a is a side view of the joined inner cage and supporting cage half-shells of FIG. 3;

FIG. 4 is a perspective view showing two inner cage half-shells and two supporting cage half-shells fitted within one another, shortly before assembly around a shaft;

DETAILED DESCRIPTION

Figure 1:
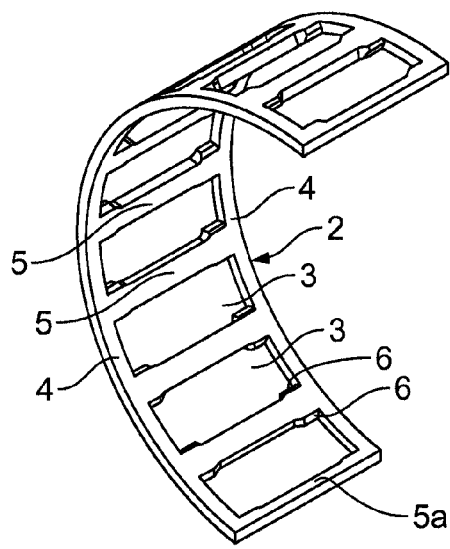
FIG. 1 is a perspective view of a supporting cage half-shell.
Figure 1A:
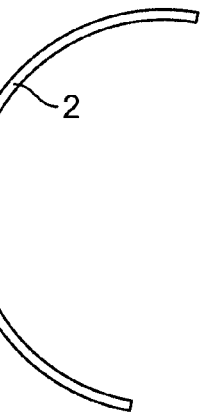
FIG. 1a is a side view of the supporting cage half-shell of FIG. 1.
Figure 2:
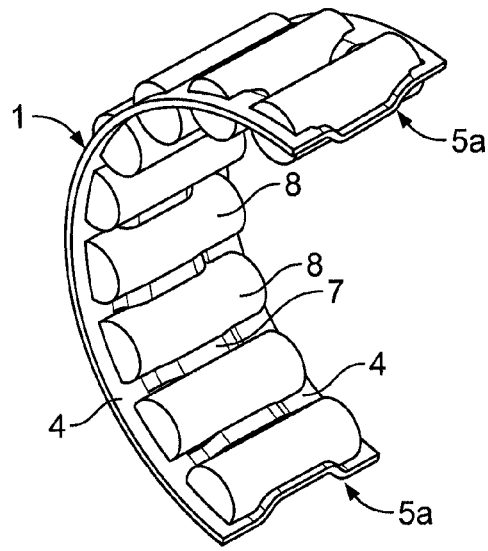
FIG. 2 is a perspective view of an inner cage half-shell, with rolling elements inserted therein.
Figure 2A:
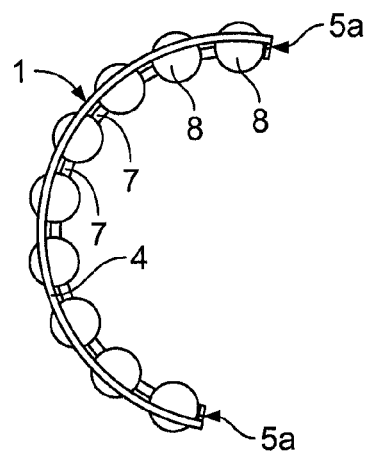
FIG. 2a is a side view of the inner cage half-shell of FIG. 2.

Referring now to the details shown in FIGS. 1 through 5b, reference numeral 1 denotes an inner cage half-shell which is disposed within a supporting cage half-shell 2. Both half-shells have windows 3, which are delimited from one another by crossbars 5 and at the sides by edge rims 4. Edge rims 4 extend semi-circularly along the sides of inner cage half-shells 1 and supporting cage half-shells 2. At the ends adjacent edge rims 4, crossbars 5 are provided with projections 6 which narrow the windows 3 at their ends facing edge rims 4. Crossbars 5 of both inner cage half-shells 1 and supporting cage half-shells 2 are narrower between the projections 6. Crossbars 5 of inner cage half-shells 1 have U-shaped, inwardly directed deformations 7 formed between projections 6.

Also, it can be clearly seen from FIGS. 1 through 5b that the end crossbars 5a at the ends of the half-shells are narrower by half the extent of the normal crossbars 5 in the circumferential direction, so that two joined end crossbars 5a together have the width of one of the normal crossbars 5. The facing end faces of the shells/end crossbars 5a are flat, because end crossbars 5a need not have projections 6 there.

Rolling elements 8 in the form of rollers are inserted into the openings of windows 3 formed by inner cage half-shells 1 and supporting cage half-shells 2.

Figure 4A:
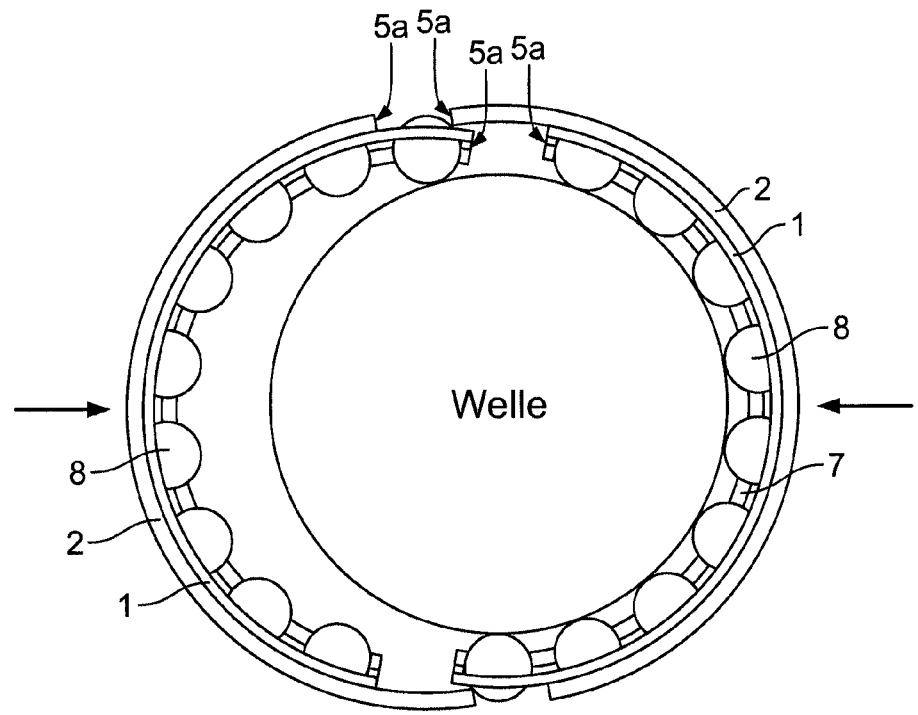
FIG. 4a is a side view of the half-shells of FIG. 4.
Figure 5:
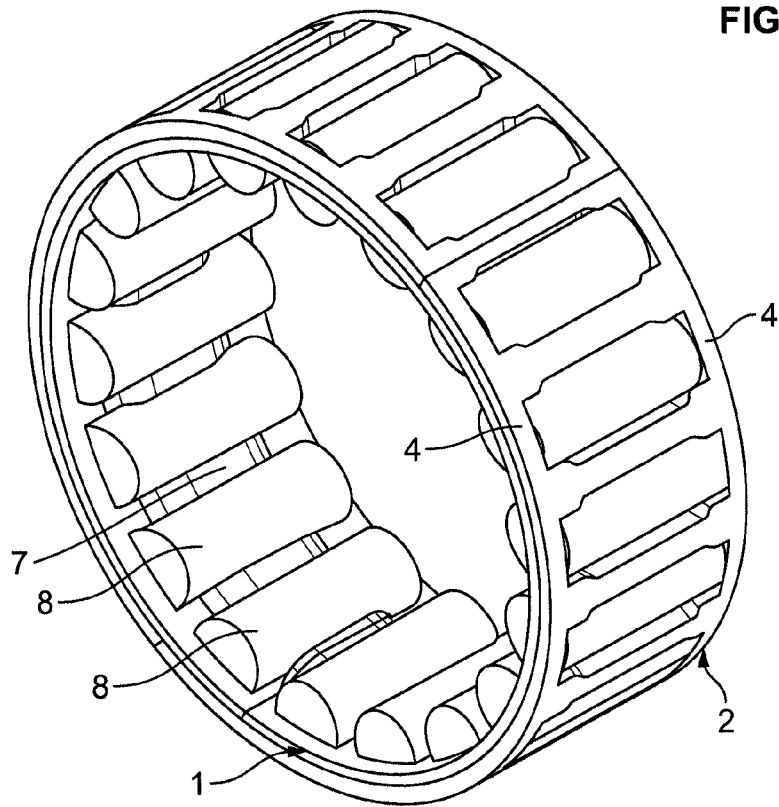
FIG. 5 is a perspective view of a complete cage assembled from four half-shells.
Figure 5A:
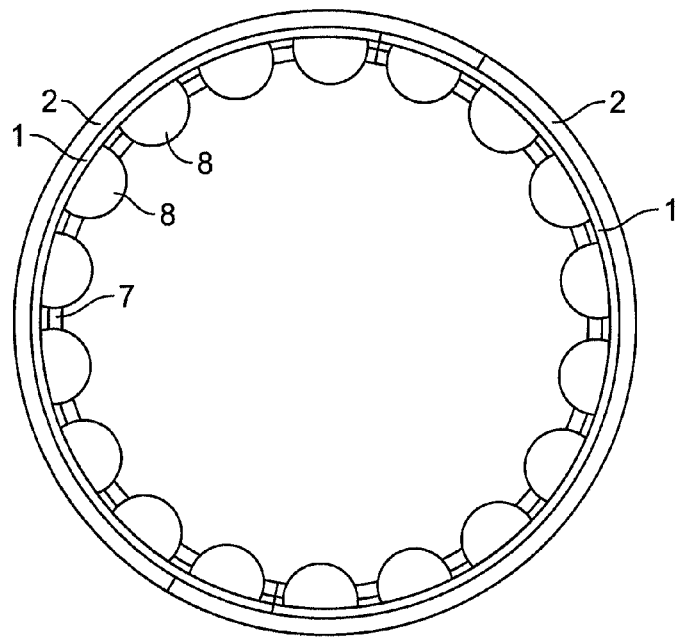
FIG. 5a is a side view of the complete cage of FIG. 5.
Figure 5B:
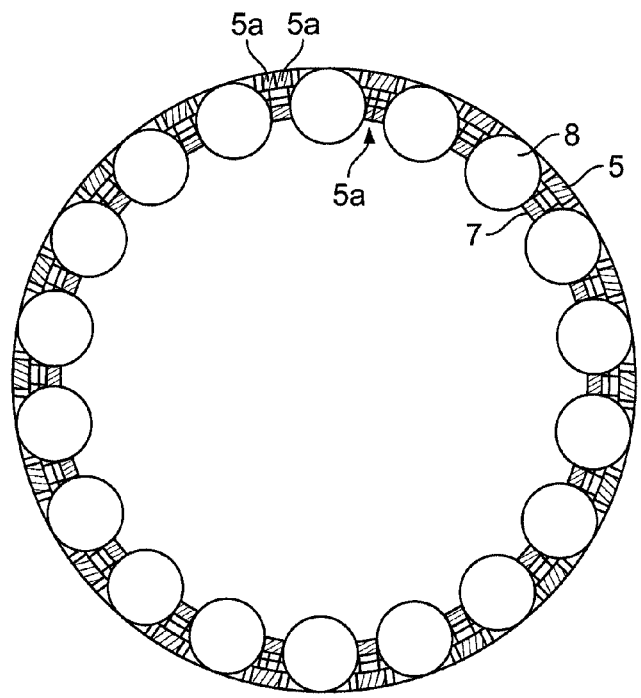
FIG. 5b is a cross-sectional view through the complete cage of FIG. 5.

As is shown in particular in FIGS. 4 through 5b, the rolling elements 8 inserted in the windows (3) at the ends of the half-shells lock the half-shells to each other once they are clipped together, so that, as shown in FIGS. 5 through 5b, a ring-shaped cage is created which is composed of four half-shells.

LIST OF REFERENCE NUMERALS 1 inner cage half-shells
2 supporting cage half-shells
3 window
4 end rim
5 crossbars
5a end crossbars
6 projections
7 deformations
8 rolling elements

What is claimed is:

1. A rolling element bearing comprising:
   a cage including at least one inner cage and at least one outer supporting cage, the inner and supporting cages having windows adapted to rolling elements and having lateral end rims connecting a plurality of the windows and having crossbars, the rolling elements being guided and secured from falling out in the windows,
   the inner cage being configured as a split inner cage ring and the supporting cage being configured as a split supporting cage ring, the inner cage ring and the supporting cage ring being attached to each other at an end,
   wherein the inner cage ring is angularly offset from the supporting cage ring by one or more windows in a circumferential direction.

2. The rolling element bearing as recited in claim 1 wherein the inner cage ring and the supporting cage ringhave end crossbars, the end crossbars being narrower by half the extent of the crossbars in the circumferential direction.

3. The rolling element bearing as recited in claim 1 wherein the inner cage ring and the supporting cage ring are secured to each other.

4. The rolling element bearing as recited in claim 3 wherein the inner cage ring and supporting cage ring are secured to each other by welding, brazing, or crimping.

5. The rolling element bearing as recited in claim 1 wherein the inner cage ring and the supporting cage ring are manufactured from sheet steel stock by profiling, stamping/lengthening, bending round or rolling round.

6. The rolling element bearing as recited in claim 1 wherein a material selected for the supporting cage ring has a different thickness than that for the inner cage ring.

7. The rolling element bearing as recited in claim 1 wherein the inner cage ring and the supporting cage ring have end crossbars, the crossbars and end crossbars each being formed with projections at ends thereof adjacent end rims, the projections facing each other.

8. The rolling element bearing as recited in claim 1 wherein the rolling elements are rollers or needles.

9. A rolling element bearing comprising:
   a cage including at least one inner cage and at least one outer supporting cage, the inner and supporting cages having windows adapted to rolling elements and having lateral end rims connecting a plurality of the windows and having crossbars, the rolling elements being guided and secured from falling out in the windows,
   the inner cage being configured as inner cage shells and the supporting cage being configured as supporting cage shells, the inner cage shells and supporting cage shells being attached to each other at an end,
   wherein the inner cage shells are offset from the supporting cage shells by one or more windows in the circumferential direction.

10. The rolling element bearing as recited in claim 9 wherein the inner cage shells are configured as inner cage half-shells and the supporting cage shells are configured as supporting cage half-shells.

11. The rolling element bearing as recited in claim 9 wherein the inner cage shells and the supporting cage shells have end crossbars, and the end crossbars are narrower by half the extent of the crossbars in the circumferential direction.

12. The rolling element bearing as recited in claim 9 wherein the inner cage shells and the supporting cage shells are secured to each other.

13. The rolling element bearing as recited in claim 9 wherein the inner cage shells and the supporting cage shells are secured by at least one of welding, brazing, and crimping.

14. The rolling element bearing as recited in claim 9 wherein the inner cage shells and the supporting cage shells are manufactured from sheet steel stock by profiling, stamping/lengthening, bending round or rolling round.

15. The rolling element bearing as recited in claim 9 wherein the material selected for the supporting cage shells has a different thickness than that for the inner cage shells.

16. The rolling element bearing as recited in claim 9 wherein the inner cage shells and the supporting cage shells have end crossbars, the crossbars and end crossbars each being formed with projections at ends thereof adjacent end rims, the projections facing each other.

17. The rolling element bearing as recited in claim 9 wherein the rolling elements are rollers or needles.

18. A rolling element bearing comprising:
- a cage including at least one inner cage and at least one outer supporting cage, the inner and supporting cages having windows adapted to rolling elements and having lateral end rims connecting a plurality of the windows and having crossbars, the rolling elements being guided and secured from falling out in the windows,
- the inner cage being configured as a split inner cage ring and the supporting cage being configured as a split supporting cage ring, the inner cage ring and the supporting cage ring being attached to each other at an end,
- wherein the inner cage ring and the supporting cage ring have end crossbars, the end crossbars being narrower by half the extent of the crossbars in the circumferential direction.

\* \* \* \* \*